117,065

UNITED STATES PATENT OFFICE.

MARGARET N. GEORGE, OF EVANSVILLE, INDIANA.

IMPROVEMENT IN MEDICINES FOR CURE OF HOG AND CHICKEN CHOLERA.

Specification forming part of Letters Patent No. 117,065, dated July 18, 1871.

*To all whom it may concern:*

Be it known that I, MARGARET N. GEORGE, of the city of Evansville, county of Vanderburg, State of Indiana, have discovered a new Compound or Medicine for the Prevention and Cure of Hog and Chicken Cholera; and I do hereby declare that the following is a full and exact description of said compound or medicine and the mode of manufacturing it.

The nature of my invention consists in providing a combination of materials possessing medicinal properties so as to effect, in its legitimate action upon the animal system, the prevention or cure of said disease.

To enable others to make and use my invention who are skilled in the art or profession of medicine, I will proceed to describe its manufacture or compounding.

In five (5) gallons of water put five (5) pounds of blackberry-root. Let this boil together thoroughly one (1) hour, after which take out the roots, and, while the water is boiling, add thereto one-half ($\frac{1}{2}$) pound of bruised allspice, one (1) ounce tincture of iron, one (1) ounce asafetida, one-half ($\frac{1}{2}$) ounce gum camphor. Let it continue to boil about twenty (20) minutes; then strain through a fine sieve; and then reduce it by boiling to one (1) gallon of the liquid or compound, which, when cooled, may be bottled for use. A larger or smaller quantity may be made by observing the same proportions.

In administering to chickens or fowls of any description, for every dozen take two (2) quarts corn-meal, one-half ($\frac{1}{2}$) pint lard, and three (3) table-spoonfuls of the medicine or compound.

In administering to hogs, for every dozen hogs take five gallons of scalded-bran slop and add one gill of the compound. This should be given them every morning while threatened with the disease or actually sick.

What I claim as my discovery, and desire to secure by Letters Patent, is—

The combination of the materials above described and the process of manufacturing the same, for the purpose set forth.

May 17, 1871.

MARGARET N. GEORGE.

Witnesses:
W. FREDERICK SMITH,
J. W. DAVIDSON.